US008433105B2

(12) United States Patent
Choi et al.

(10) Patent No.: US 8,433,105 B2
(45) Date of Patent: Apr. 30, 2013

(54) METHOD FOR ACQUIRING REGION-OF-INTEREST AND/OR COGNITIVE INFORMATION FROM EYE IMAGE

(75) Inventors: Hyeong In Choi, Seoul (KR); Dae Hoon Kim, Seoul (KR); Sung Jin Lee, Seoul (KR); Hwan Pyo Moon, Anyang-si (KR); Seung Min Paik, Seoul (KR); Song Hwa Kwon, Bucheon-si (KR); Jung Kyo Sohn, Seoul (KR)

(73) Assignee: Iritech Inc., San Jose, CA (US)

( * ) Notice: Subject to any disclaimer, the term of this patent is extended or adjusted under 35 U.S.C. 154(b) by 203 days.

(21) Appl. No.: 13/123,230

(22) PCT Filed: Oct. 6, 2009

(86) PCT No.: PCT/KR2009/005704
§ 371 (c)(1),
(2), (4) Date: Apr. 7, 2011

(87) PCT Pub. No.: WO2010/041861
PCT Pub. Date: Apr. 15, 2010

(65) Prior Publication Data
US 2011/0194738 A1 Aug. 11, 2011

(30) Foreign Application Priority Data
Oct. 8, 2008 (KR) .................... 10-2008-0098518

(51) Int. Cl.
*G06K 9/00* (2006.01)
(52) U.S. Cl.
USPC ........... 382/117; 382/115; 382/173; 382/190; 382/291
(58) Field of Classification Search .................. None
See application file for complete search history.

(56) References Cited

U.S. PATENT DOCUMENTS

| 6,549,118 B1 * | 4/2003 | Seal et al. ............... 340/5.82 |
| 2005/0152583 A1 | 7/2005 | Kondo et al. |
| 2008/0069410 A1 * | 3/2008 | Ko et al. ............... 382/117 |

FOREIGN PATENT DOCUMENTS

| KR | 10-2005-0044073 A | 5/2005 |
| WO | WO 03/054777 A1 | 7/2003 |
| WO | WO 2006/054827 A1 | 5/2006 |

OTHER PUBLICATIONS

PCT International Search Report for PCT Counterpart Application No. PCT/KR2009/005704 containing Communication relating to the Results of the Partial International Search Report, 4 pgs., (May 18, 2010).

*Primary Examiner* — Claire X Wang
*Assistant Examiner* — David Perlman
(74) *Attorney, Agent, or Firm* — Blakely, Sokoloff, Taylor & Zafman LLP

(57) ABSTRACT

The present invention provides a method for acquiring region-of-interest and/or cognitive information from an eye image, comprising the steps of: preprocessing, standardizing, and coding the group of eye images for region-of-interest information or cognitive information to create eye image codes and to build a characteristic eye library in a memory in order to improve an iris recognition rate; grouping and partitioning or covering eye codes for eye images stored in the characteristic eye library into a plurality of groups, and obtaining a representative eye code of each of the eye code groups, preprocessing, standardizing, and coding a new eye image not assigned region-of-interest information or cognitive information in the same way as the above-described step to create a test eye code, matching the test eye image to the most similar eye image in the characteristic eye library, and transferring the region-of-interest information or cognitive information assigned to the matched eye image to the test eye image. The transferred information is utilized in the preprocessing of the eye image.

24 Claims, 9 Drawing Sheets (a)

(b)

(a)

(b)

(a)

(b)

(a)

(b)

- Eye angle:-7 degrees
- Iris covered at:upper side
- Area of eye covered:small
- Iris covered by:eyelid
- Glasses:no (a)

- Ehye angle:-3 degrees
- Iris covered at:upper side
- OArea of eye covered:medium
- Iris covered by:eyelid
- Glasses:no (b)

METHOD FOR ACQUIRING REGION-OF-INTEREST AND/OR COGNITIVE INFORMATION FROM EYE IMAGE

CROSS-REFERENCE TO RELATED APPLICATIONS

This patent application is a U.S. National Phase application under 35 U.S.C. §371 of International Application No. PCT/KR2009/005704, filed Oct. 6, 2009, entitled METHOD FOR ACQUIRING REGION-OF-INTEREST AND/OR COGNITIVE INFORMATION FROM EYE IMAGE, which claims priority to Korean patent application number 10-2008-0098518, filed Oct. 8, 2008.

TECHNICAL FIELD

The present invention relates to a method for acquiring region-of-interest and/or cognitive information from an eye image. The method comprises the steps of: establishing a set of eye images to be used as a library of region-of-interest information or cognitive information in order to improve an iris recognition rate; creating eye image codes (hereinafter, referred to as "eye code(s)") by preprocessing, standardizing and coding the respective eye image samples stored in the library in a memory; providing additional region-of-interest information or cognitive information to the respective eye image samples to establish a characteristic eye library of eye images to which the eye code and the additional region-of-interest or cognitive information about each of the eye image samples are provided; grouping, partitioning or covering the eye codes of the eye images pertaining to the characteristic eye library into a plurality of groups to obtain a representative eye code for each of the eye groups; creating a test eye code for a test eye image by preprocessing, standardizing and coding a new eye image, to which region-of-interest information or cognitive information is not provided, by the same process as described above; searching and matching the test eye image in the established characteristic eye library to the most similar eye code; and transferring region-of-interest information or cognitive information regarding the matched eye image to the test eye image, so that the method can be used for a preprocessing procedure of transferring the region-of-interest information or the cognitive information to the test eye image in an iris recognition device.

BACKGROUND ART

In an iris recognition system, there is a need for correct extraction of an iris region or user's region-of-interest (ROI) from a given iris image to enhance performance and efficiency. Further, if geometrical features such as shape, position, rotated angle (i.e. an angle of an eye moved from the horizontal), etc. of an iris region can be determined within the eye image, these features can also be used as very important information in iris recognition. Further, information about the degree of covering the iris, the kind of object covering the iris, and photographed conditions of an iris image may be very useful in an iris recognition system.

Generally, the aforementioned information regarding an eye image can be regarded as region-of-interest information of a user and cognitive information recognized by a person. Although such information can be automatically obtained by certain algorithms, it is very difficult to correctly obtain this information or to obtain an eye image in a desired direction. For example, in the case of obtaining iris boundary information, it is difficult to set up the boundary of the iris region, if the boundary of the iris region is blurred by change in illumination around a camera when photographing the iris image or if the iris region and its boundary are covered by an eyebrow, an eyelid, glasses, etc.

Work such as determination of an inner region and a boundary of an object in a digital image refers to image segmentation, which is one of the most difficult operations in digital image processing. The image segmentation refers to segmenting a given image into several regions or objects, the main purpose of which is to distinguish and completely isolate a region-of-interest from other objects in the given image. Various image segmentation techniques are used in the art. As general automatic segmentation methods, a segmentation method based upon detection of a sudden change within an image, a segmentation method based upon gradual enlargement of a region having a similar feature, a segmentation method based upon modelling of an object to be detected, and the like are used in the art.

However, most conventional segmentation methods pertain to a bottom-up type which attempts to directly determine a desired image from an individual image. In this case, however, an undesired segmentation result can be obtained under conditions that an eye image includes serious noise, that an iris region has a non-finite boundary due to covering of eyelashes, etc. Further, even though the boundary is correctly determined from such a non-finite form, it is different to determine the region and the boundary in a desired form (e.g., in a definite form easy for a user to manipulate), and thus, it is difficult to obtain a satisfactory result using existing automatic techniques.

To solve this problem, a semiautomatic segmentation technique, in which a user makes a rough segmentation guideline and applies a certain algorithm to the rest of segmentation, is used. This method has a disadvantage in that a user must make guidelines one by one with regard to all images.

Even in the case of semantic information or circumstantial information about an eye image as well as information about the aforementioned geometrical region, a person can easily recognize such information from a digital image, but it is very difficult to automatically extract the information through an algorithm. Over the past few decades, various bottom-up techniques have been proposed in the field of vision, machine learning, and artificial intelligence, but these techniques are not useful in systematic and correct extraction of the semantic information or circumstantial information.

In recent Webs, various attempts have been made to enable intelligent Web searching based on the semantic and circumstantial information under the title of semantic Web. However, these attempts are simply for current search-oriented applications, not for extracting such information from given media.

DISCLOSURE

The present invention is conceived to solve such problems of the related art, and an aspect of the present invention is to provide a top-down method of obtaining geometrical information containing information about user's region-of-interest (ROI) and its boundary from an eye image. Here, the method includes establishing a database of eye image samples, previously providing and storing geometrical information about the region-of-interest by an assistant (marking) of an expert with regard to cognitive information of the respective eye image samples, and obtaining the geometrical information about region-of-interest from a new input eye image through retrieval of the previously stored geometrical information.

Another aspect of the present invention is to provide a top-down method of obtaining cognitive information about an eye image which is difficult to directly extract using a conventional automated algorithm or takes a long time to extract. The method includes establishing eye image samples having various information into a set of eye images to be used as a library in a memory, previously providing and storing the cognitive information to the respective sample images through an offline assistant (tagging) of an expert, and providing cognitive information from a new input eye image through retrieval of the previously stored geometrical information with regard to the new input eye image.

A further aspect of the present invention is to provide a method of increasing an iris recognition rate by obtaining geometrical information about region-of-interest of an eye image on the basis of similarity to other eye images and using the geometrical information in a preprocessing procedure in an iris recognition device.

Yet another aspect of the present invention is to a method of reducing time required to search for previously stored information by grouping the previously stored information.

In accordance with one aspect of the invention, a method of obtaining region-of-interest or cognitive information (to be defined in the following exemplary embodiments) of an eye mage includes: establishing a set of eye images (hereinafter, also referred to as a "set of eye image samples" or an "eye image sample database") to be used as a library on a memory with regard to region-of-interest or cognitive information; creating an eye code by preprocessing, standardizing and coding each of the eye image samples pertaining to the eye image sample database; providing additional region-of-interest or cognitive information to each of the eye image samples and establishing a database (hereinafter, referred to as a "characteristic eye library") containing the additional region-of-interest or cognitive information related to the eye code of each of the eye image samples; grouping the eye codes of the eye images pertaining to the characteristic eye library into a plurality of groups (hereinafter, referred to as an "eye group(s)") as a partitioning or covering process to obtain a representative eye code for each eye group; creating an eye code for a test eye image (hereinafter, referred to as a "test eye code") by preprocessing, standardizing and coding a new eye image (hereinafter, referred to as a "test eye image"), for which the region-of-interest or cognitive information has not been provided, by the same procedures as described above; matching the test eye image to the most similar eye code in the established characteristic eye library; and transferring the region-of-interest or cognitive information provided to the matched eye code to the test eye image.

In accordance with another aspect of the present invention, there is provided a top-down type method of obtaining region-of-interest information or cognitive information of an eye image as a preprocessing procedure for the eye image in obtaining geometrical information including information about region-of-interest and its boundary from the eye image. The method includes: storing eye image samples having cognitive information and various geometrical information about region-of-interest in a database in a memory through an offline assistant (marking) of an expert; and obtaining geometrical information about region-of-interest from a new input eye image through retrieval of the previously stored geometrical information.

In accordance with another aspect of the present invention, there is provided a top-down type method of obtaining region-of-interest information or cognitive information of an eye image as a preprocessing procedure for the eye image in obtaining the cognitive information regarding the eye image which is difficult to directly extract using a conventional automated algorithm or takes a long time to extract. The method includes previously storing eye image samples having various geometrical information in a database in a memory through an offline assistant (tagging) of an expert and providing cognitive information from a new input eye image through retrieval of the previously stored geometrical information.

In accordance with a further aspect of the present invention, a method of obtaining region-of-interest information or cognitive information as a preprocessing procedure for an eye image is provided. The method includes: increasing an iris recognition rate by obtaining geometrical information regarding region-of-interest of an eye image on the basis of similarity to other eye images and using the geometrical information in a preprocessing procedure in an iris recognition device; or grouping the previously stored information to reduce time taken for retrieval of the previously stored information.

According to exemplary embodiments of the invention, in obtaining geometrical information containing information about region-of-interest (ROI) and its boundary from an eye image, a database of eye image samples having various information is established, and geometrical information about the region-of-interest is previously provided and stored through an offline assistant (marking) of an expert to obtain cognitive information of the respective eye image samples, so that geometrical information about new region-of-interest of a new input eye image can be obtained by a top-down method through retrieval of the previously stored geometrical information.

In addition, according to the exemplary embodiments, in obtaining cognitive information about an eye image which is difficult to directly extract using a conventional automated algorithm or takes a long time to extract, eye image samples having various information are established into a set of eye images to be used as a library in a memory, and cognitive information of the respective sample images is provided and stored through an offline assistant (tagging) of an expert, so that cognitive information of a new input eye image can be provided by a top-down method through retrieval of the previously stored geometrical information.

Further, according to the exemplary embodiments, geometrical information regarding region-of-interest of an eye image is obtained on the basis of similarity with another eye image, and the geometrical information is used in a preprocessing procedure in an iris recognition device, thereby increasing an iris recognition rate.

Further, according to the exemplary embodiments, information in a database is grouped by providing cognitive information to each of the eye image samples, thereby reducing time for retrieval.

DESCRIPTION OF DRAWINGS

The above and other objects, features and advantages of the present invention will be more clearly understood from the following detailed description taken in conjunction with the accompanying drawings, in which.

BEST MODE

The present invention provides a method of obtaining region-of-interest information and/or cognitive information from eye images including images of an eye and a part around the eye. The method includes establishing a database of eye image samples constituted by eye images; extracting an eye code of each of the eye image samples in the database of eye image samples; establishing a characteristic eye library containing the extracted eye codes of the respective eye image samples and region-of-interest information and/or cognitive information provided to each of the eye image samples; extracting an eye code of a new eye image, region-of-interest information and/or cognitive information of which will be extracted; matching the eye code of the new eye image to the most similar eye code by comparing the eye code of the new eye image with the respective eye codes stored in the characteristic eye library; and transferring region-of-interest information and/or cognitive information of the matched eye code to the new eye image.

Figure 1:
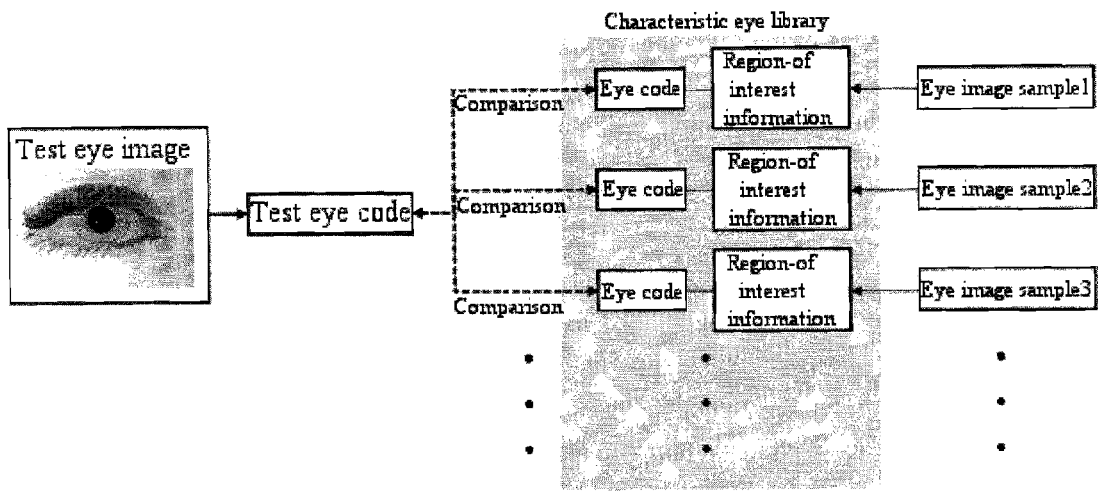
FIG. 1 is a concept view of a method for acquiring region-of-interest and/or cognitive information according to an exemplary embodiment of the present invention.
Figure 2:
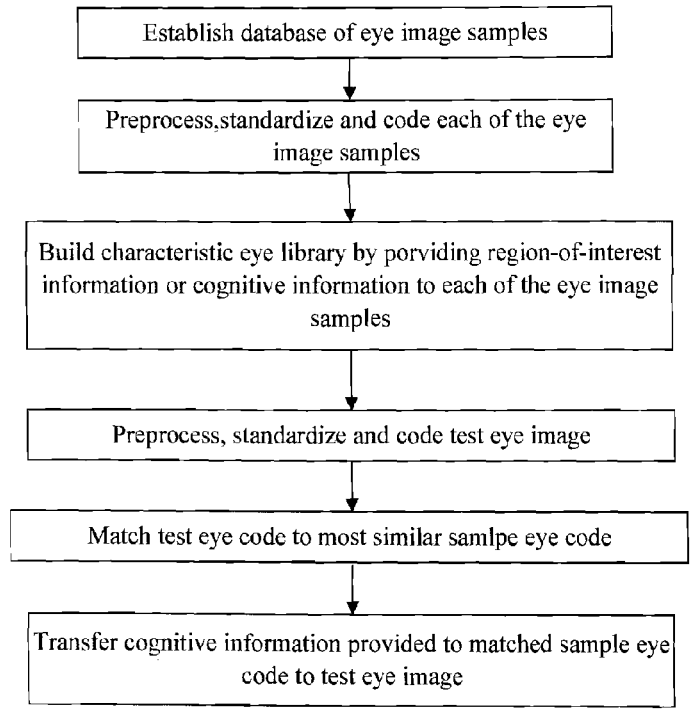
FIG. 2 is a flowchart of the method for acquiring region-of-interest and/or cognitive information according to the exemplary embodiment of the present invention.

Exemplary embodiments of the invention will be described in detail with reference to accompanying drawings. FIG. 1 is a concept view of a method for acquiring region-of-interest and/or cognitive information according to an exemplary embodiment and FIG. 2 is a flowchart of the method for acquiring region-of-interest and/or cognitive information according to the exemplary embodiment.

First, establishment of an eye image sample database according to an exemplary embodiment will be examined. To make a characteristic eye library, a set of eye image samples is first configured. Generally, the term "eye image" means a digital image of an eye and an extended region including the periphery of the eye.

The set of eye image samples may be configured in various ways to have large variation in terms of region-of-interest information or cognitive information. For example, if desired region-of-interest for a certain eye image is information about an eye region exposed to the outside, various images of the eye in an open state may be used as the eye image samples.

The eye image samples may be images obtained by directly photographing a person's eye, or artificial eye images created by modeling the eye and its surroundings. In the case of creating certain artificial eye images, the sizes, shapes, colors, texture and correlations of the pupil, the iris, the white region, the eyelid and the eyelashes constituting an eye, and external conditions such as illumination, glasses, etc., are modeled to randomly create a plurality of eye images containing images of the eye and its surroundings.

Next, configuration of the characteristic eye library will be examined.

The characteristic eye library includes an eye code created for each of the eye image samples (hereinafter, an eye code extracted from an eye image sample will be referred to as a "sample eye code"), and the region-of-interest or cognitive information of the eye image samples. The respective eye image samples may or may not be included in the characteristic eye library. In this embodiment, it is assumed that the eye image is a grayscale eye image. Alternatively, the eye image may be a color eye image. It should be understood by those skilled in the art that such a change in the eye image pertains simply to software design change.

a. Preprocessing and Standardization of Eye Image

Since the artificial eye image can be previously standardized, it can be created without any separate preprocessing. However, for eye images obtained by directly photographing a person's eye, since the eye images are photographed under various conditions, there is a need for preprocessing the eye images in order to facilitate extraction of information or for standardization of the eye images for comparison with each other. As to the preprocessing and standardization of the eye images, it is assumed that the preprocessing and the standardization have been achieved by any method for creating eye codes described later. Since the preprocessing and standardization of the eye images can depend on the desired region-of-interest or cognitive information, the eye images can be preprocessed and standardized in various viewpoints according to the kind of region-of-interest or cognitive information. In this embodiment, preprocessing and standardization will be described in terms of image size, histogram, image filtering, translation and orientation, rescaling, an unimportant part, etc.

Image Size

With respect to images having the same resolution, the size of a photographed eye varies depending on the distance from a camera when photographing the eye. In this regard, the size of the photographed image is adjusted to a similar eye size.

Histogram

Through contrast adjustment, given eye images are adjusted such that contrast regions thereof are within the same range or have the same contrast distribution standard. For this purpose, in this embodiment, a histogram equalization technique is used. That is, a transform function is determined to provide the same contrast distribution standard to all of the eye images, and is applied to a relative frequency distribution with respect to a contrast value of each of the eye images, thereby standardizing the histogram of the eye images.

Image Filtering

The photographed eye images may have different noise levels, blur levels, etc., according to photographing conditions. If the noise level is controlled, i.e., smoothing is performed, it is performed in a spatial domain by a Gaussian filter, a median filter, etc. In the case of a frequency domain, noise can be removed through various low-pass filters. Further, to make an object clear, a sharpening technique may be applied using a derived function. To restore a damaged image, a de-convolution technique or the like may be used.

Translation and Orientation

According to the photographed eye image, the center of an eye (i.e. the center of the pupil) is likely to deviate from the center of the eye image. At this time, a new eye image is created by cropping an original eye image to a certain size such that the center of the eye is aligned with the center of the eye image.

Further, since the eye images are all different in an angle rotated from the horizontal direction, they can be rotated to be within the same angle range, e.g., rotated to be horizontal, thereby standardizing the eye images.

Local Rescaling

Figure 3:
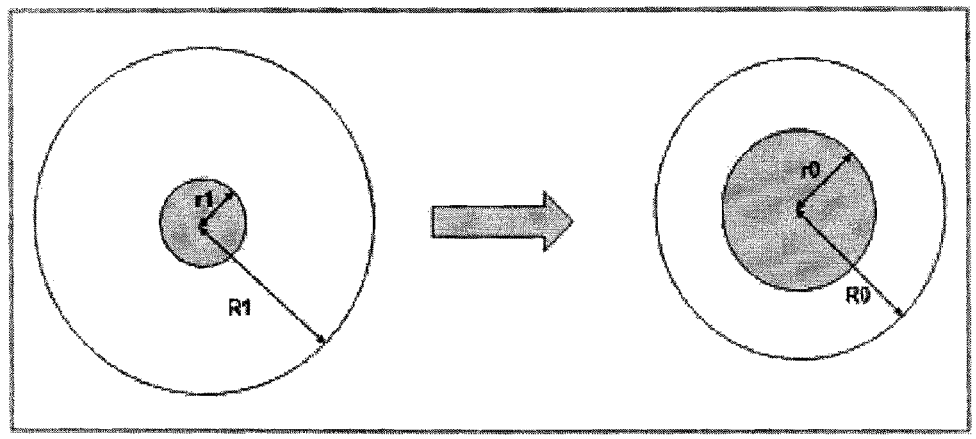
FIG. 3 is a view explaining scale standardization of an eye image according to an exemplary embodiment of the present invention.
Figure 3:
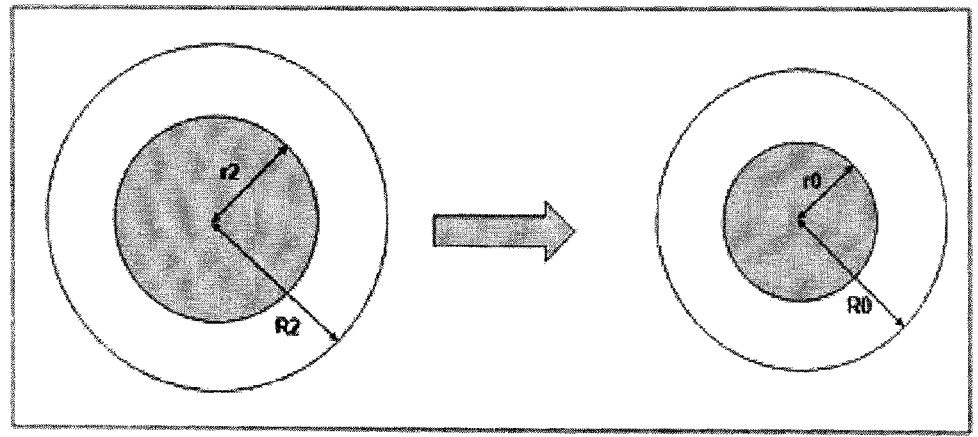

When photographing an eye, the size of the pupil, the size of the iris, etc. are varied depending on a surrounding environment. In particular, the pupil may contract or expand in response to changes in brightness. In this regard, the eye image is adjusted such that an inner radius of the iris (the radius of the pupil) and an outer radius of the iris (the radius of a disc including the whole iris region) have a constant size. FIG. 3 shows a procedure whereby eye images having different radii from the standards are converted to have the standard radii, in the case where the standards of the inner and outer radii are set to r0 and R0, respectively. For example, FIG. 3(a) shows that the pupil smaller than the standards (r1<r0) is enlarged but the iris region is reduced, and FIG. 3(b) shows that the pupil larger than the standards (r2>r0) is reduced and the iris region is also reduced. Here, the boundary of the pupil or the boundary of the iris may be determined using an existing algorithm, or may be determined by eye image transition according to an exemplary embodiment using the boundary of the pupil or the iris as region-of-interest information.

In addition, the region-of-interest of the eye image may be locally reduced or enlarged according to where the region-of-interest is in the eye image.

Removal of Unimportant Part

When obtaining desired region-of-interest information or cognitive information, an eye image may be divided into an important part and an unimportant part. Since the unimportant part can become a hindrance when obtaining the region-of-interest information or cognitive information, it is advantageous to remove the unimportant part from the eye image in order to facilitate obtaining of the region-of-interest information or cognitive information.

Figure 4:
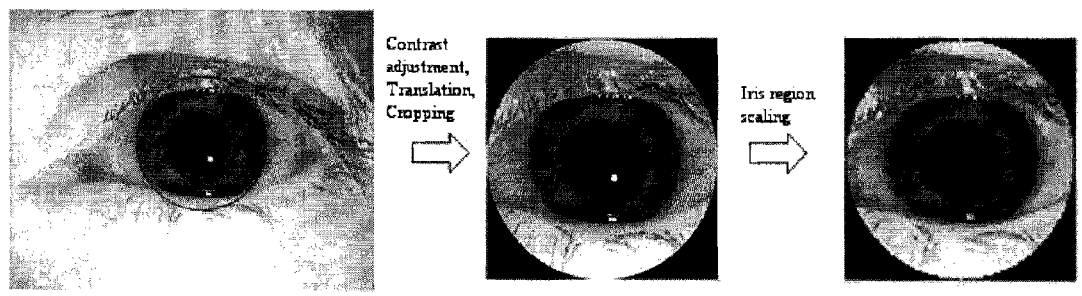
FIG. 4 is a view explaining histogram, image center and scaling standardization of an eye image according to an exemplary embodiment of the present invention.
Figure 4:
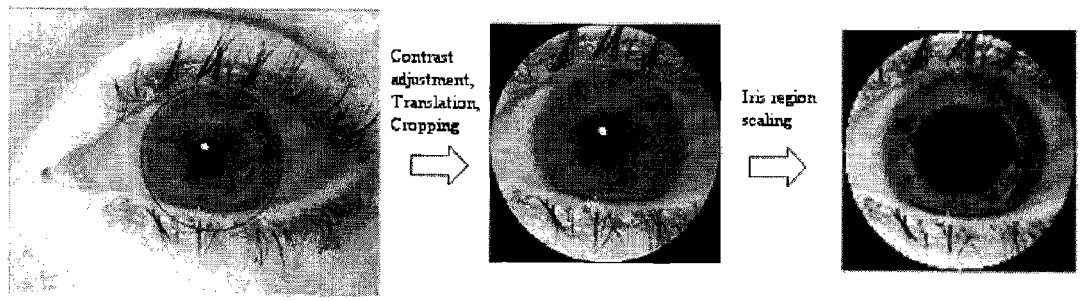

FIG. 4 shows that an eye image is preprocessed and standardized through many procedures to obtain boundary information of the eye region exposed to the outside. First, an outside part corresponding to a certain radius, e.g., as much as 1.5 times the outer radius of the iris with respect to the center of the pupil, is selected from the original eye image, and the remaining part is subjected to histogram adjustment and scaling, thereby obtaining a new eye image. Since the pupil is not important in obtaining the boundary information of the eye region exposed to the outside, it is removed. In two finally preprocessed and standardized images (i.e. the rightmost images), the size of the pupil and the thickness of the iris are similar to each other.

b. Eye Code of Eye Image

Two or more eye codes may be provided to each eye image sample. For example, a plurality of rotated eye images are newly created by rotating an original eye image within a certain angle range, and an eye code is created for each rotated eye image, thereby providing a set of eye codes to the original eye image.

Since there is no difference in description of the invention regardless of whether a single or a plurality of eye codes is provided to each of the eye image samples, it is assumed for convenience that a single eye code is provided to each of the eye image samples.

The eye code is a code representing a color and texture features of an eye image and can be configured by various representation schemes in various domains The eye code is provided in the form of a feature vector where numerical values are arranged. First, when the eye code of the eye image can be obtained without information about other eye images, the eye code may be configured by selectively using one of:

a vector extracted from representation in a spatial domain including gray levels of each pixel in the image;

a vector extracted from representation obtained by applying a transform such as a Fourier transform, a wavelet transform, etc. to the eye image representation in the spatial domain; and a vector extracted from representation obtained by applying a Radon transform or the like integral transform to the eye image representation in the spatial domain.

On the contrary, when a separate eye image sample must be analyzed to obtain an eye code for each of eye images, the eye code may be achieved by a vector obtained by representing an eye image using principal component analysis (PCA);

a vector obtained by representing an eye image using linear discriminant analysis (LDA); and a vector obtained by representing an eye image using independent component analysis (ICA). At this time, one of these three kinds of vectors may be selectively used when applying each of these analysis techniques.

In this embodiment, two examples of creating the eye code based on region-of-interest information and cognitive information to be transferred will be described. First, an example of configuring an eye code by applying PCA to the eye image in the spatial domain having a gray level of a pixel for general eye image representation will be described.

To obtain a principal component of an eye image through PCA, m preprocessed and standardized eye images are prepared separate from the set of eye image samples. Alternatively, m preprocessed and standardized eye images may be extracted from the set of eye image sample. The prepared eye images will be called $J\_1, J\_2, \ldots, J\_m$, respectively. If the respective eye images have the same length of k, a covariance matrix (marked M) of the eye images is a k×k matrix.

k eigen vectors for the matrix M, i.e. a vector E satisfying a relational expression ME=aE (where a is a real number), are obtained and respectively called $E\_1, E\_2, \ldots, E\_k$ (suppose that they are in descending order with regard to an eigen value), and these vectors will be called "eigen-eyes."

An eye code of a given eye image is generated using the foregoing eigen-eye. Because k can be a very high value, p eigen-eyes at a high rank with respect to the eigen value "a" are selected and used to generate the eye code. If the given eye image is named I and p selected eigen-eyes are respectively renamed $E\_1, E\_2, \ldots, E\_p$, the eye code for the given eye image I becomes a p-dimensional vector (<E\_1, I>, <E\_2, I>, …, <E\_p, I>) (where, '<, >' means a dot product of two vectors).

As another method, the eye image can be represented by the eye code on the basis of statistical characteristics that each part of the eye image locally has. For example, there is a representation technique using a local binary pattern (LBP). In this embodiment, another example of creating the eye code through a method similar to the LBP in order to transfer boundary information of the region-of-interest will be described.

First, a general algorithm is used to determine a boundary of the eye image. If one pixel of the eye image is regarded as the boundary, 1 is given to the pixel; otherwise, 0 is given to the pixel. A pixel to which 1 is provided is called a boundary point, and a pixel to which 0 is provided is called a non-boundary point. With respect to each pixel of the eye image, a region having a disc shape of a certain size is set. Assume that the size of the eye image is M×N and a pixel at a position $(i, j)$ (where, $i=1, \ldots, M, j=1, \ldots, N$) is $p(i, j)$. Further, assume a circle having a center of $p(i, j)$ is $D(i, j)$, and a line passing the pixel $p(i, j)$ and forming an angle of x degrees to the horizontal is $L(i, j, x)$. The number of pixels $h(i, j, x)$ on the boundary is counted among the pixels where the line $L(i, j, x)$ and the disc $D(i, j)$ meet. If the angle x is changed from 1 degree to 360 degrees, all 360 values of $h(i, j, x)$ are obtained and the following vectors are obtained.

$h(i, j, 1), h(i, j, 2), \ldots, h(i, j, 360)$.

These vectors will be called a boundary signature for the pixel $(i, j)$ and indicated as $S(i, j)$. If the boundary signatures are obtained with regard to all of the pixels $(i, j)$, an M×N matrix is obtained. This matrix is defined as the eye code for the given eye image.

Through the foregoing various processes, all eye codes are created for the respective eye image samples in the eye image sample database.

c. Region-of-Interest Information and Cognitive Information

According to an exemplary embodiment, region-of-interest information about an eye image indicates information about a geometrical region (an inner region and a boundary) of an object forming a scene represented by the eye image, which includes information about a user's target region as well as information about a specific object.

In other words, the region-of-interest information regarding the eye image may include a region occupied by an object forming the eye image and a boundary thereof, and/or a user's target region in the eye image and a boundary thereof.

According to an exemplary embodiment, cognitive information about an image comprehensively means information containing semantic information about the kind of object forming a scene represented by the image and recognized by a person and relationship between the objects, etc., and circumstantial information such as surrounding environments, backgrounds, etc., which form the scene.

As the region-of-interest information of the eye image, there are an iris region and its boundary information, an inner eye region and its boundary information, and a covering region or covering boundary due to an eyelid, eyelash, glasses, contact lens, illumination, shadow, etc. In terms of iris recognition, the cognitive information regarding the eye image may include an angle of a person's face with respect to a camera lens, an angle where an eye views a camera lens, a rotated angle of an eye, the distance between the center of the iris and the center of the eye image, a covered part of the iris, the degree of covering the iris, the kind of object covering the iris such as glasses, the eyelid, position and brightness of illumination, contact lenses, etc.

The region-of-interest and the cognitive information regarding the eye image can be obtained by various methods such as image segmentation, computer vision, and artificial intelligence. However, it is difficult to obtain such information with high quality through conventional techniques. Thus, an expert may directly provide the region-of-interest or the cognitive information to eye image samples pertaining to the eye image sample database through tagging, marking, etc. Further, the region-of-interest and the cognitive information may be primarily obtained through such conventional automatic techniques, and then finally provided to the eye image samples through an assistance of an expert so as to be recorded in a database stored in a memory.

Figure 5:
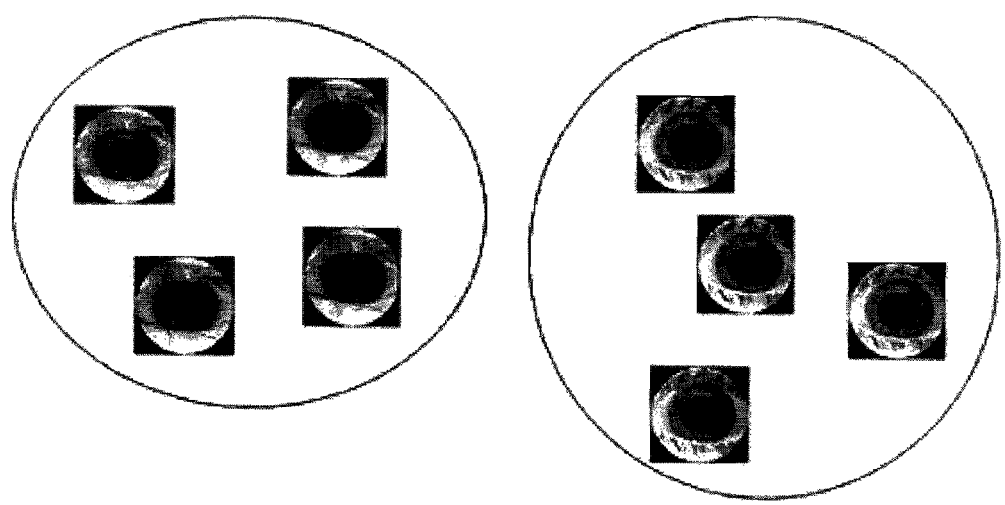
FIG. 5 is a view explaining a process of grouping eye image samples as a process of partitioning and covering according to an exemplary embodiment of the present invention.
Figure 5:
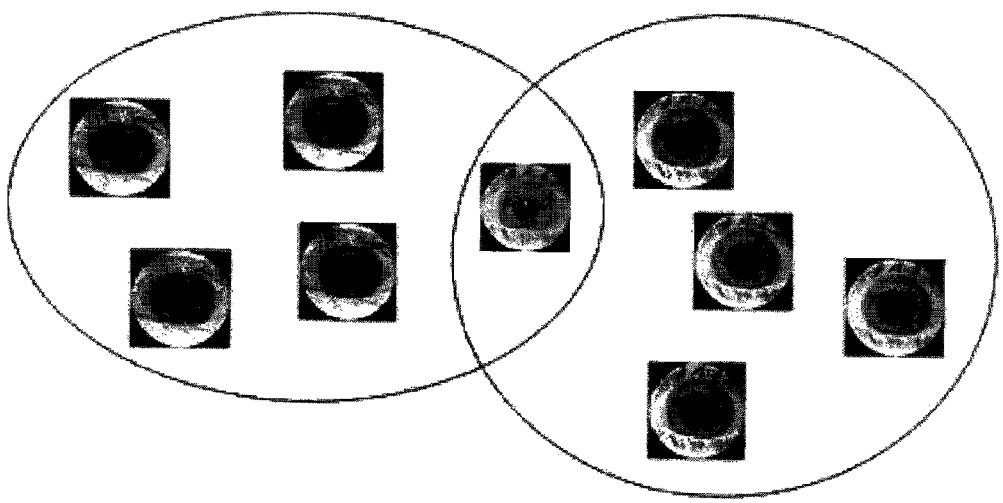

In FIG. 5, a red curve indicates that the eyelid and the inner eye boundary except for the eyelashes are marked by an expert. Marking was applied to different eye images, respectively. In this case, the region-of-interest is an eye part exposed to the outside. Thus, the eyelashes are generally excluded, but this does not mean that a user wants to have a non-finite boundary (uneven like saw-teeth), which completely excludes the eyelashes. Referring to FIG. 5, the boundary is selected to form a smooth curve while including an eye part sufficiently exposed to the outside, instead of completely removing the eyelashes covering the eye. Such boundary information marked by an expert is provided to the eye image sample or the eye code.

Figure 6:
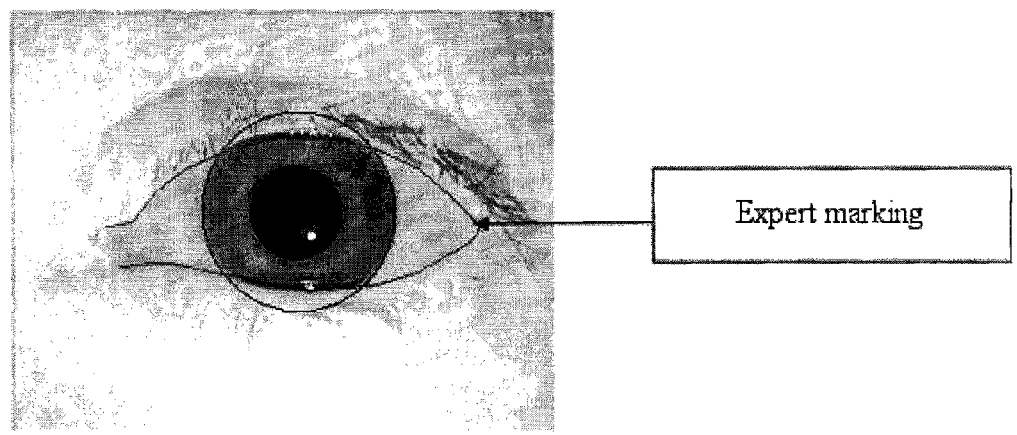
FIG. 6 is views of boundary information in geometrical region information with expert marking in eye images according to an exemplary embodiment of the present invention.
Figure 6:
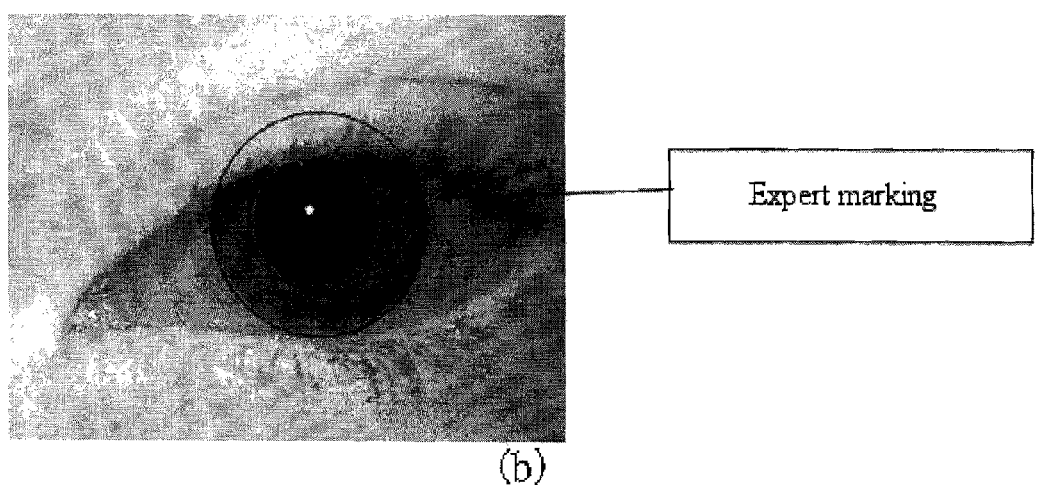

FIG. 6 shows an example where cognitive information is provided to two different eye images, respectively.

Next, the step of creating an eye group and a representative eye code of each eye group will be examined in more detail.

a. Eye Group

This step is performed to prevent a reduction in processing speed and memory capacity due to excessive eye image samples.

A classification or clustering technique used for pattern recognition is applied to eye codes of a characteristic eye library or eye images corresponding thereto, thereby creating a plurality of eye groups. Since a single eye code corresponds to a single eye group in this embodiment, the eye group is regarded as a group of corresponding eye images. A single eye group may be composed of a single eye code. A standard for distinguishing the groups from each other is provided by desired region-of-interest or cognitive information. Thus, the characteristic eye library may have two or more groups at the same time according to the number of desired regions-of-interest or cognitive information. Further, in each grouping, the characteristic eye library may be hierarchical or flat. In the case where the characteristic eye library is hierarchical, a single eye group may include several subsidiary eye groups.

Figure 7:
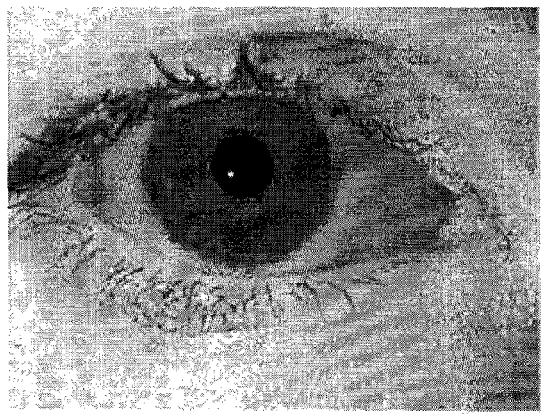
FIG. 7 is views of semantic information provided to eye images according to an exemplary embodiment of the present invention.
Figure 7:
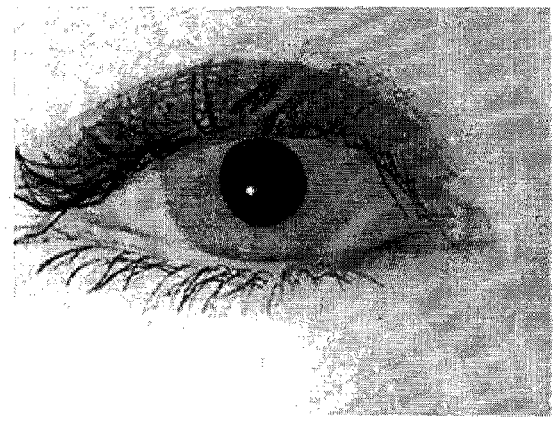

The groups may overlap each other. That is, a certain eye code pertaining to the characteristic eye library may also belong to a plurality of groups at the same time. Here, this kind of grouping will be called covering. If an intersection between eye groups is an empty set, in other words, if the groups do not overlap, it will be called partitioning FIG. 7 shows a set of eye images divided into two groups. A first case shows partitioning, and a second case shows covering. Further both groups are flat.

b. Creation of Representative Eye Code

Each eye group has a representative code (also called a "prototype").

The eye group includes a plurality of eye codes, so that a representative eye code can be created from the eye codes in the eye group and provided to the corresponding eye group. If the eye group includes only a single eye code, this eye code is directly used as the representative eye code of the eye group.

As an example of the representative eye code for each group, an average obtained by averaging the eye codes may be selected. If eye codes of one group are $C\_1, \ldots, C\_n$, respectively, the representative eye code (marked with MC) of the group is $MC=(C\_1+\ldots+C\_n)/n$.

An intermediate value, a weighted average, a geometrical average, etc., may be employed as the representative eye code of the group.

Next, preprocessing, standardization and coding steps for a test eye image will be examined.

As in the method of creating an eye code when configuring a test eye library, the test eye library is preprocessed, standardized and coded.

To improve performance of comparison with the characteristic eye library, a plurality of eye codes may be provided to the test eye image. For example, new eye images may be obtained by rotating the test eye image one degree by one degree within a certain range to create eye codes. If the test eye image is rotated from −30 degrees to +30 degrees, a total of 61 eye codes is created.

Next, matching operation based on comparison of the eye codes will be examined. In the case where the eye codes are grouped and stored in the characteristic eye library and a representative eye code is provided to each group, the matching operation includes the step of matching a test eye image to a proper eye group having high similarity in the characteristic eye library, and the step of matching a test eye image to a proper eye image sample having high similarity in the eye group matched to the test eye image. If the selected eye group includes only a single eye image, that is, the characteristic library is not separately grouped, the two above steps are integrated into one step.

As such, matching the test eye image to the eye group or the eye image includes classifying given test eye images according to classes or labels of the eye groups (or the eye codes if not grouped) stored in the characteristic eye library. To this end, various classification techniques may be used. For example, one of a technique of using similarity between two codes as a classifier, a technique of using a Bayes classifier, a neural network technique, a support vector machine technique, a machine learning technique including a decision-making tree technique, and the like, may be used.

In this embodiment, a classification technique using similarity or correlation between two codes as a classifier is used. However, it should be understood that other classification techniques may also be selected and used by those skilled in the art.

Since each eye code is a vector, similarity between two eye codes may be variously measured through similarity between two vectors. Measurement of similarity between two vectors may include similarity measurement based on correlation such as cosine similarity and Tanimoto similarity; similarity measurement using Minkowski distance such as Manhattan distance, a Euclid distance, etc.; similarity measurement of providing a weighted value to each component; and so on. One of such various methods may be selected and used for similarity measurement.

For example, the similarity between the two codes is measured by a value inversely proportional to the Euclid distance between the two codes. That is, if a value obtained by calculating the Euclid distance is small, it is determined that the similarity is high; otherwise, the similarity is low.

On the basis of the similarity measurement, a method or mechanism for matching the test eye image to the eye code included in the characteristic eye library will be described. If the characteristic eye library includes n eye groups, let the representative eye codes thereof be $G\_1, G\_2, \ldots, G\_n$, respectively, and the test eye code of the test eye image be U. Each eye code and each representative eye code used herein are the eye code obtained by PCA as described above. Alternatively, an eye code obtained by another general technique may be used. The Euclid distance between the test eye code and the representative eye code is calculated as follows.

$$|G\_1-U|, |G\_2-U|, \ldots, |G\_n-U|.$$

The minimum distance is determined from among the above distances, and an eye group corresponding thereto is selected. Let the sample eye codes contained in this eye group be $C\_1, C\_2, \ldots, C\_m$. Now, the Euclid distance between the test eye code and the representative eye code is calculated again as follows.

$$|C\_1-U|, |C\_2-U|, \ldots, |C\_m-U|.$$

Figure 8:
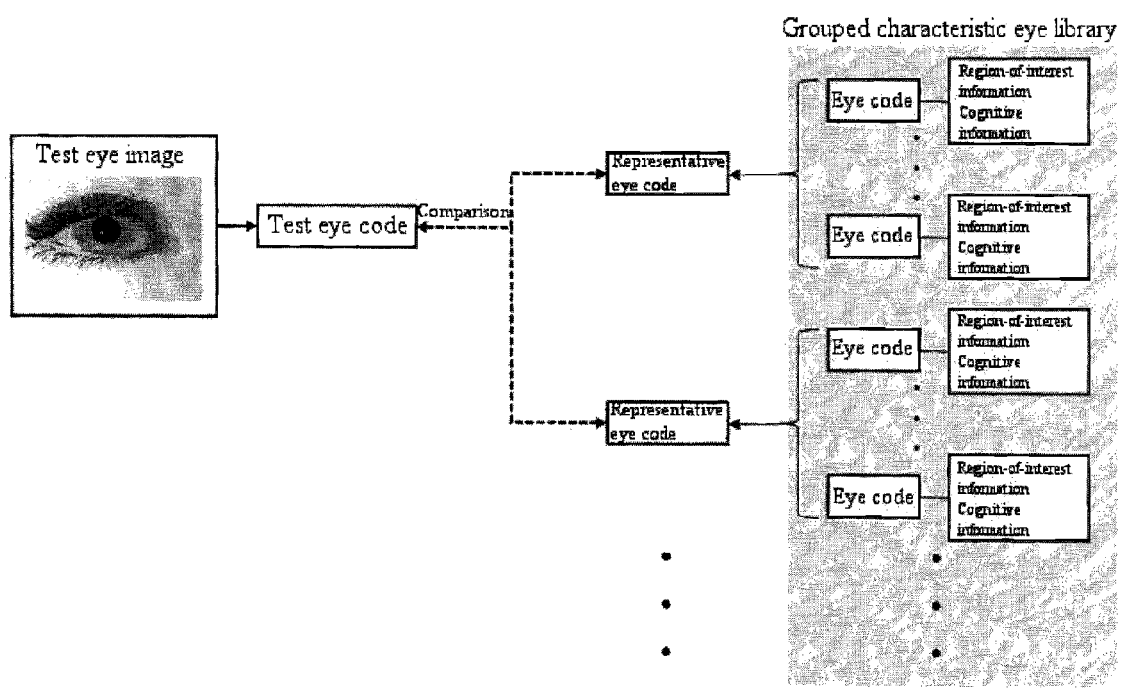
FIG. 8 is a block diagram of a comparison method for a test eye code based on a grouped characteristic eye library according to an exemplary embodiment of the present invention.

The minimum distance is determined from among the above distances, and let a sample eye code corresponding thereto be C. Then, the test eye image is finally matched to the sample eye code C. FIG. 8 shows a diagram showing the foregoing procedure. If each eye group of the characteristic eye library includes only a single eye image, the above two steps are integrated into one step.

If a plurality of test eye codes is provided to the test eye image, all of the test eye codes are matched to the characteristic eye library, as described above, and the sample eye code having the minimum distance is then retrieved. For example, a total of 61 eye codes is created by rotating the test eye image one degree at a time within a range from −30 degrees to +30 degrees, and then the test eye codes are matched to the eye codes in the characteristic eye library by the same method as described above. Among the eye codes matched to the 61 test eye codes, the most similar eye code is selected.

Next, the step of transferring and applying the region-of-interest and cognitive information will be examined. The region-of-interest or cognitive information previously provided to the sample eye code C of the characteristic eye library matched to the test eye image is transferred or applied to the test eye image.

Figure 9:
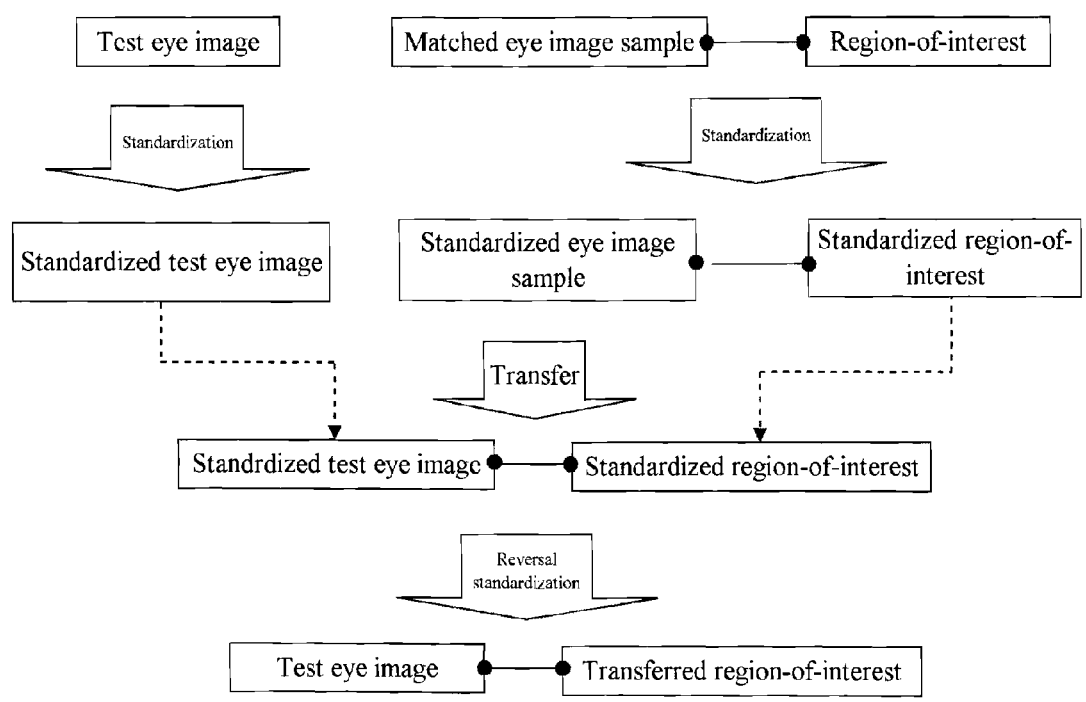
FIG. 9 is a block diagram of a method of transferring region-of-interest information to a test eye image according to an exemplary embodiment of the present invention.

In the cognitive information, some information can be directly transferred, but direct transfer of the cognitive information is likely to provide an undesired result. Particularly, in the case of the region-of-interest information, the test eye image may be subjected to stepwise scaling, translation, rotation, etc. without being directly transferred, and then the region-of-interest information may be transferred to the test eye image. An example of transferring the region-of-interest information is as follows. FIG. 9 is a block diagram of a method of transferring region-of-interest information to a test eye image. Assuming the test eye image is I_test, the most similar eye image sample is I_sample, and the region-of-interest information provided to the eye image sample I_sample is J. If an operation corresponding to standardization including rotation, translation, local scaling, etc. is N, N(I_test) shows an image standardized with regard to the test eye image I_test. Meanwhile, N(I_sample+J)=N(I_sample)+N(J) shows an image obtained by standardizing I_sample+J where the region-of-interest information J is combined with the eye image sample I_sample. If the region-of-interest information can changed to a digital image, and the standardization N is related to local and wide geometrical transform for an image, it can be understood that N(I_sample+J)=N(I_sample)+N(J). If reversal standardization (a reverse procedure to standardization) to the standardization N is M, M(N(I_test)+N(J)) becomes a final image where the region-of-interest information J of the eye image sample I_sample is transferred and combined with the test eye image I_test.

As such, the region-of-interest information or cognitive information transferred to the test eye image not only becomes information about the test eye image, but also is used as guideline for obtaining more correct information.

Figure 10:
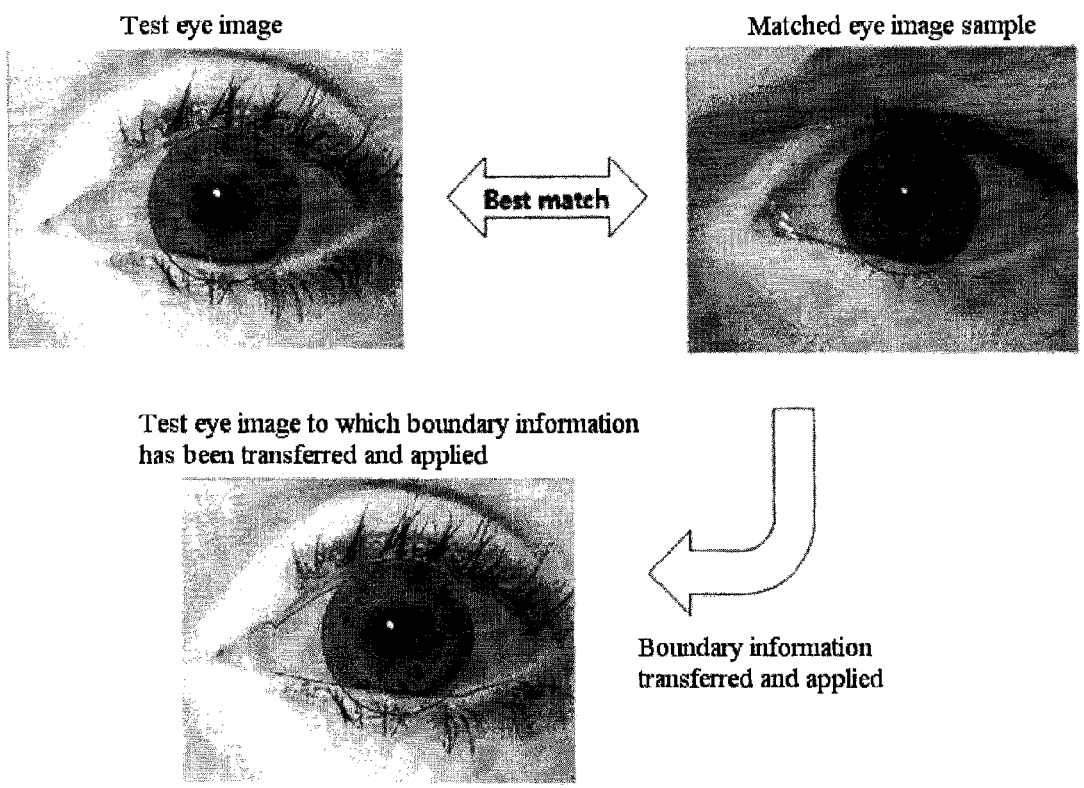
FIG. 10 is views of eye images obtained by transferring boundary information to a test eye image according to an exemplary embodiment of the present invention.

FIG. 10 illustrates that the transferred test eye image is matched to the most similar eye image sample through eye code comparison and boundary information marked on the matched eye image sample is then transferred to the test eye image. In FIG. 10, since test eye images and matched eye image samples are obtained from different persons, eye surroundings and iris regions have different textures. However, the geometrical shapes of the eye regions in the two eye images are similar to each other. Thus, the transferred boundary in FIG. 10 fits the test eye image relatively well even though there is slight error at an upper side. Further, on the basis of the transferred boundary information, i.e. when using the transferred boundary information as a guideline, local analysis is additionally performed, so that more correct boundary information can be extracted.

[Industrial Applicability]

According to the exemplary embodiments, a set of eye images corresponding to region-of-interest information or cognitive information is preprocessed, standardized and coded to create eye image codes and configure a characteristic eye library in a database; the eye codes of the eye images stored in the characteristic eye library are grouped to apply a partitioning or covering operation to a plurality of groups to obtain a representative eye code for each eye group; a new eye image, to which the region-of-interest information or the cognitive information is not provided, is preprocessed, standardized and coded by the same process to thereby create a test eye code; the test eye image is matched to the most similar eye image in the characteristic eye library; and the region-of-interest information or cognitive information provided to the matched eye image is transferred to the test eye image, so that the region-of-interest information or cognitive information can be used in the preprocessing procedure of the eye image, thereby improving iris recognition rate and industrial applicability.

What is claimed is:

1. A method of obtaining region-of-interest information and/or cognitive information from eye images comprising images of an eye and a part around the eye, comprising:
   establishing a database of eye image samples constituted by eye images, wherein the database of eye image samples is configured by creating an artificial eye image through modeling, or is configured using eye images obtained by photographing a real eye;
   extracting an eye code of each of the eye image samples stored in the database; establishing a characteristic eye library comprising the extracted eye codes of the respective eye image samples and region-of-interest information and/or cognitive information provided to each of the eye image samples,
   wherein the region-of-interest information regarding the eye image comprises a region occupied by an object forming the eye image and a boundary thereof, and/or a user's target region in the eye image and a boundary thereof, wherein the region-of-interest information regarding the eye image comprises a region occupied by an object forming the eye image and a boundary thereof, and/or a user's target region in the eye image and a boundary thereof;
   extracting an eye code of a new eye image, region-of-interest information and/or cognitive information of which will be extracted;
   matching the eye code of the new eye image to the most similar eye code by comparing the eye code of the new eye image with the eye codes stored in the characteristic eye library;
   and transferring the region-of-interest information and/or the cognitive information of the matched eye code to the new eye image.

2. The method of claim 1, wherein the cognitive information regarding the eye image comprises at least one selected from the group consisting of an angle of a person's face with respect to a camera lens, an angle where an eye views the camera lens, a rotated angle of the eye, and a combination thereof.

3. The method of claim 1, wherein the cognitive information regarding the eye image comprises at least one selected from the group consisting of the kind of object covering an eye, a covering position and a covered degree, and a combination thereof.

4. The method of claim 1, wherein the cognitive information regarding the eye image is configured by varying a position or brightness of illumination when photographing the eye image.

5. The method of claim 1, wherein the region-of-interest information regarding the eye image comprises at least one selected from the group consisting of a pupil region, a pupil boundary, an iris region, an iris boundary, a covered region, a boundary of the covered region, a region of an eye exposed to an outside, and a boundary of a region of an eye exposed to the outside, and a combination thereof.

6. The method of claim 5, wherein the region-of-interest information regarding the eye image is used to create an eye code through at least one selected from size adjustment, histogram adjustment, image filtering, translation, rotation and local scaling, and removal of an unimportant part from the eye image, and a combination thereof to perform preprocessing and standardization when providing an eye code to each of the eye image samples.

7. The method of claim 6, wherein the standardization for histogram adjustment comprises a histogram equalization technique.

8. The method of claim 6, wherein the image filtering comprises smoothing filtering comprising Gaussian filtering, or sharpening filtering using a derived function.

9. The method of claim 6, wherein the local scaling comprises equally applying a ratio between an inner radius of an iris and an outer radius of the iris to all of the eye images.

10. The method of claim 1, wherein a mechanism for searching for an eye code to improve a recognition rate by comparing the test eye code with the respective eye codes stored in the characteristic eye library is configured by editing and storing the respective eye codes stored in the characteristic eye library with labels and classifying a test eye code in accordance with the labels, in which a classification technique selectively uses one of a technique of employing similarity between two codes as a classifier, a technique of using a Bayes classifier, a neural network technique, a support vector machine technique, and a machine learning technique including a decision-making tree technique.

11. The method of claim 10, wherein the eye code of the eye image is extracted by selecting one of eye image representation in a spatial domain, eye image representation based on Fourier transform, eye image representation based on wavelet transform, eye image representation based on Radon transform, and eye image representation based on a histogram of a numerical value showing a local feature in each pixel of the eye image; or the eye code about the eye image is extracted by configuring a separate set of eye images and selectively applying one of principal component analysis (PCA), linear discriminant analysis (LDA), and independent component analysis (ICA) techniques to the separate set.

12. The method of claim 10, wherein, if the similarity between two codes is used as a classifier for searching for the most similar eye code by comparing the test eye code with the respective eye codes stored in the characteristic eye library, measured through similarity between two vectors, measurement of the similarity comprises selecting one of similarity measurement based on correlation such as cosine similarity and Tanimoto similarity; similarity measurement using Minkowski distance such as Manhattan distance and Euclid distance; and similarity measurement of providing a weighted value to each component.

13. The method according to claim 1, wherein the transferring the region-of-interest information about the matched eye image sample to the test eye image comprises applying a local transform to the region-of-interest information or the test eye image stepwise and then transferring the region-of-interest information about the matched eye image sample to the test eye image.

14. The method of claim 13, wherein the transferring the region-of-interest information about the matched eye image sample to the test eye image comprises standardizing an image formed when the region-of-interest information is added to the eye image sample, standardizing the test eye image by the same process as in the eye image sample, and transferring and combining the standardized region-of-interest information to the standardized test eye image, and reversely standardizing the combined image.

15. The method of claim 13, wherein the region-of-interest information about the matched eye image is more correctly extracted through additional local analysis on the basis of a result transferred to the test eye image.

16. The method of claim 10, wherein the eye code provided to the test eye image is configured by providing two or more eye codes.

17. The method of claim 16, wherein the two or more test eye codes provided to the test eye image are respectively matched to the most similar sample eye codes among the eye codes stored in the characteristic eye library with regard to all of the test eye codes, and the most similar eye code is retrieved among the matched sample eye codes and matched to the test eye image.

18. The method of claim 17, wherein the two or more test eye codes provided to the test eye image creates new eye images by changing an angle of the test eye image bit by bit within a certain angle range, and new eye codes are respectively provided to the created new eye images one by one to provide two or more eye codes to the test eye image.

19. The method of claim 10, wherein the characteristic eye library is partitioned or converted into a plurality of eye groups in accordance with region-of-interest or cognitive information.

20. The method of claim 19, wherein each eye group comprises a representative eye code provided thereto.

21. The method of claim 20, wherein a mechanism for searching for the most similar eye code by comparing the test eye code with the respective eye codes stored in the characteristic eye library comprises comparing the test eye code with each of representative eye codes, searching for the most similar eye group, comparing each of the sample eye codes pertaining to the eye group with the test eye code, and selecting the sample eye code most similar to the test eye code from among the sample eye codes.

22. The method of claim 21, wherein the representative eye code for each eye groups comprises an average value obtained by averaging eye codes pertaining to the eye group.

23. The method of claim 21, wherein the grouping the characteristic eye library comprises hierarchical grouping or flat grouping.

24. The method of claim 21, wherein the grouping the characteristic eye library according to region-of-interest or cognitive information comprises a clustering technique of grouping similar eye codes into a cluster.

\* \* \* \* \*